(12) United States Patent
Ishikawa et al.

(10) Patent No.: US 10,738,526 B2
(45) Date of Patent: Aug. 11, 2020

(54) ACTUATOR AND VEHICLE DOOR OPENING/CLOSING ACTUATOR

(71) Applicant: Mitsuba Corporation, Kiryu-shi, Gunma (JP)

(72) Inventors: Masazumi Ishikawa, Kiryu (JP); Takayuki Ikeda, Kiryu (JP); Takashi Takizawa, Kiryu (JP); Tsuyoshi Maruyama, Kiryu (JP)

(73) Assignee: Mitsuba Corporation, Gunma (JP)

( * ) Notice: Subject to any disclaimer, the term of this patent is extended or adjusted under 35 U.S.C. 154(b) by 387 days.

(21) Appl. No.: 15/620,073

(22) Filed: Jun. 12, 2017

(65) Prior Publication Data

US 2017/0362876 A1    Dec. 21, 2017

(30) Foreign Application Priority Data

Jun. 17, 2016    (JP) .................. 2016-120591

(51) Int. Cl.
| | |
|---|---|
| *E05F 15/622* | (2015.01) |
| *H02K 5/10* | (2006.01) |
| *H02K 5/14* | (2006.01) |
| *H02K 7/14* | (2006.01) |

(52) U.S. Cl.
CPC ............ *E05F 15/622* (2015.01); *H02K 5/10* (2013.01); *H02K 5/14* (2013.01); *H02K 7/14* (2013.01); *E05Y 2900/546* (2013.01)

(58) Field of Classification Search
CPC ... H02K 5/10; H02K 5/14; H02K 7/14; E05Y 2900/546; E05F 15/622
USPC .......................................................... 310/71
See application file for complete search history.

(56) References Cited

U.S. PATENT DOCUMENTS

| | | | | |
|---|---|---|---|---|
| 8,127,634 | B2* | 3/2012 | Reif | F16D 7/021 |
| | | | | 74/89.34 |
| 9,653,964 | B2* | 5/2017 | Nakamura | H02K 23/38 |
| 9,957,746 | B2* | 5/2018 | Kaihatsu | F16H 1/28 |
| 10,110,100 | B2* | 10/2018 | Takamura | H02K 5/161 |

(Continued)

FOREIGN PATENT DOCUMENTS

| | | |
|---|---|---|
| JP | S59095759 U | 6/1984 |
| JP | 07-030564 U | 6/1995 |

(Continued)

OTHER PUBLICATIONS

Japanese Patent Office, Office Action issued in JP 2016-120591 dated Oct. 8, 2019, 6 pages.

*Primary Examiner* — Forrest M Phillips

(74) *Attorney, Agent, or Firm* — Wood Herron & Evans LLP

(57) ABSTRACT

A vehicle door opening/closing actuator includes a tubular housing, a motor part accommodated in the housing, a feeding apparatus accommodated in the housing and that supplies power to the motor part, and a closed-bottom tubular seal section that has a circumferential wall arranged to be interposed between an inner circumferential surface of the housing and an outer circumferential surface of the feeding apparatus, and that is arranged to cover the feeding apparatus with an entire thereof, wherein a rib extending in a circumferential direction is formed at an inner circumferential surface of the circumferential wall of the seal section, and a concave section that receives the rib is formed at the outer circumferential surface of the feeding apparatus.

12 Claims, 6 Drawing Sheets

(56) References Cited

U.S. PATENT DOCUMENTS

| | | | | |
|---|---|---|---|---|
| 2010/0162839 A1* | 7/2010 | Reif | ............... | F16D 7/021 74/89.38 |
| 2015/0180306 A1* | 6/2015 | Nakamura | ............ | H02K 23/38 310/68 R |
| 2017/0191553 A1* | 7/2017 | Heiberger | ............... | F16H 25/20 |
| 2018/0216391 A1* | 8/2018 | Takizawa | ................ | B60J 5/10 |

FOREIGN PATENT DOCUMENTS

| | | |
|---|---|---|
| JP | H09215254 A | 8/1997 |
| JP | 2014100956 A | 6/2014 |

* cited by examiner

ACTUATOR AND VEHICLE DOOR OPENING/CLOSING ACTUATOR

CROSS-REFERENCE TO RELATED APPLICATION

Priority is claimed on Japanese Patent Application No. 2016-120591, filed Jun. 17, 2016, the content of which is incorporated herein by reference.

BACKGROUND OF THE INVENTION

Field of the Invention

The present invention relates to an actuator and a vehicle door opening/closing actuator used to open and close a door such as an automobile tailgate or the like.

Description of Related Art

In the related art, as a vehicle door opening/closing apparatus, a configuration in which an actuator (a support member) configured to open and close a tailgate by expanding and contracting in an axial direction is installed between surroundings of an open section at a vehicle body side and the tailgate (a backdoor) capable of being open/close and installed at the open section (for example, see Japanese Unexamined Patent Application, First Publication No. 2014-100956) is known.

Such an actuator includes a first housing having a tubular shape, a second housing having a diameter larger than the first housing and into which the first housing is inserted, a motor part (a motor) installed in the first housing, a screw spindle connected to the motor part via a reduction gear and disposed coaxially with the motor part, a spindle nut fixed to the second housing and threadedly engaged with the screw spindle, and a compression coil spring accommodated in the second housing and configured to bias the first housing and the second housing in an expansion direction.

The motor part and the reduction gear are individually installed in the first housing. Then, drawing is performed on the motor housing, and a bearing configured to rotatably support a rotary shaft of the motor part is installed. Meanwhile, the reduction gear is rotatably supported by the rotary shaft of the motor part and the screw spindle.

With such a configuration, in the actuator, when the motor part is rotated and driven, rotation of the output shaft of the motor part is transmitted to the screw spindle via the reduction gear, and the screw spindle is rotated.

The spindle nut threadedly engaged with the screw spindle is moved in an axial direction of the screw spindle by rotation of the screw spindle. Accordingly, the second housing protrudes from and retracts into the first housing, and the actuator expands and contracts.

SUMMARY OF THE INVENTION

Incidentally, since the above-mentioned actuator obtains electric power supplied to the motor part from a battery installed in a vehicle body, a harness is connected between the battery and the actuator. Since the actuator is installed in an area exposed to an outside of a cabin, once a harness routed from the battery is extracted to the outside of the cabin, the harness is connected to the motor part in the actuator. For this reason, sealability of a connecting place between the actuator and the harness should be sufficiently secured.

Here, when a sealing member is not securely fixed, the sealing member may be shifted with respect to the housing (the first housing or the second housing) in an axial direction or may be rotated in a circumferential direction. In this case, a sealing section may be misaligned with respect to a feeding apparatus in the motor part. When the sealing member is misaligned, sealability may be deteriorated while deteriorating assemblability of the actuator due to guidance of the harness being hindered.

An aspect of the present invention is directed to provide an actuator and a vehicle door opening/closing actuator capable of improving sealability while improving assemblability.

The present invention employs the following configurations.

(1) An actuator according to an aspect of the present invention includes a tubular housing; a motor part accommodated in the housing; a feeding apparatus accommodated in the housing and that supplies power to the motor part; and a closed-bottom tubular seal section that has a circumferential wall arranged to be interposed between an inner circumferential surface of the housing and an outer circumferential surface of the feeding apparatus, and that is arranged to cover the feeding apparatus with an entire thereof, wherein a rib extending in a circumferential direction is formed at an inner circumferential surface of the circumferential wall of the seal section, and a concave section that receives the rib is formed at the outer circumferential surface of the feeding apparatus.

According to the above-mentioned configuration, deviation of the seal section with respect to the feeding apparatus in an axial direction can be prevented. For this reason, assemblability of the actuator can be improved and sealability can be improved.

(2) In the aspect of (1), the feeding apparatus may include a brush that supplies power to the motor part; a holder main body that supports the brush; and a cover section disposed at an end surface of the holder main body, wherein the holder main body and the cover section may cooperate to form the concave section, and the rib may be disposed between the holder main body and the cover section.

According to the above-mentioned configuration, assembly of the seal section to the feeding apparatus can be easily performed. For this reason, assemblability of the actuator can be further improved. In addition, positioning of the seal section with respect to the feeding apparatus can be reliably performed, and deviation of the seal section in the axial direction can be reliably prevented.

(3) In the aspect of (2), the cover section may have a claw section that engages with the holder main body, the rib may have a first positioning section that performs positioning of the cover section with respect to the seal section in the axial direction; and a second positioning section that performs positioning of the cover section with respect to the seal section in the circumferential direction, and the claw section may be disposed at a position corresponding to the second positioning section.

In this way, a relative position between the feeding apparatus and the seal section in the axial direction can be easily determined by forming the first positioning section.

In addition, rotation of the seal section with respect to the feeding apparatus can be prevented by forming the second positioning section. For this reason, assemblability of the actuator can be further improved. Moreover, as the claw section is disposed at a position corresponding to the second positioning section, there is no need to separately install a retaining structure of the seal section, and the rotation of the seal section with respect to the feeding apparatus can be prevented with a simple structure.

(4) In the actuator according to any one of the aspects (1) to (3), an auxiliary seal section that secures sealability between the seal section and the housing may be formed at an outer circumferential surface of the circumferential wall of the seal section, and the auxiliary seal section may be formed as a protrusion throughout a circumference of the outer circumferential surface of the circumferential wall and is disposed in a vicinity of the rib.

According to the above-mentioned configuration, the protrusion is held radially inward by the housing, and further, the rib may be held radially inward in the radial direction (the feeding apparatus side). For this reason, turning-up of the seal section can be prevented, and misalignment of the seal section can be more reliably prevented.

(5) A vehicle door opening/closing actuator according to an aspect of the present invention that uses the actuator according to any one of the aspects (1) to (4) in order to open/close a door that is installed to be capable of being opened and closed with respect to an open section, wherein the housing may be connected to any one of the open section and the door.

According to the above-mentioned configuration, it is possible to provide a vehicle door opening/closing actuator capable of improving sealability while improving assemblability.

According to the aspect of the present invention, deviation of the seal section with respect to the feeding apparatus in the axial direction can be prevented. For this reason, sealability can be improved while improving assemblability of the actuator.

DETAILED DESCRIPTION OF THE INVENTION

Next, an embodiment of the present invention will be described on the basis of the accompanying drawings.
(Vehicle Door Opening/Closing Actuator)

Figure 1:
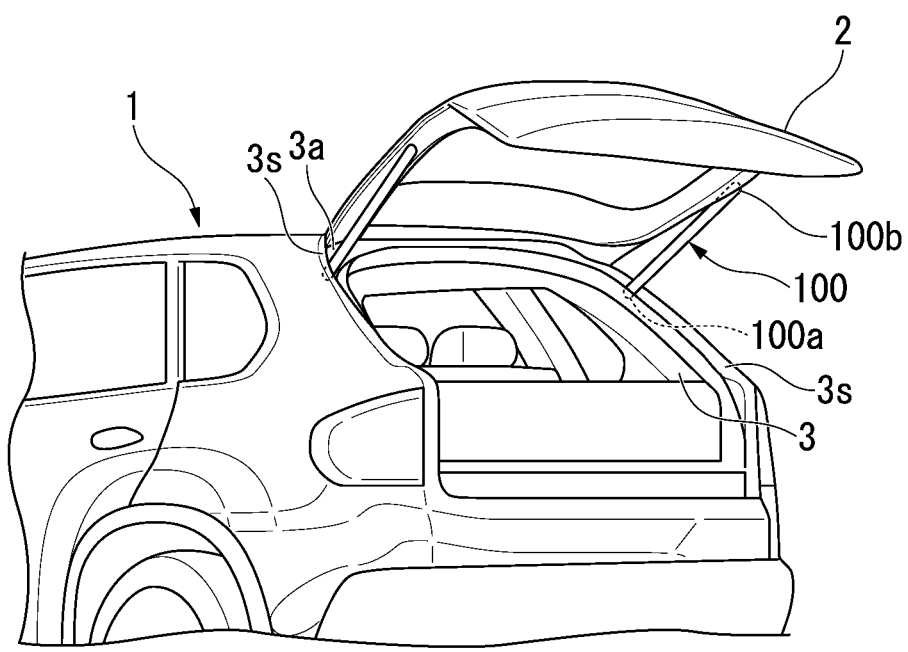
FIG. 1 is a perspective view showing an example of a vehicle including a vehicle door opening/closing actuator according to an embodiment of the present invention.

FIG. 1 is a perspective view showing an example of a vehicle including vehicle door opening/closing actuators 100 (hereinafter, simply referred to as actuators 100) according to the embodiment of the present invention.

As shown in FIG. 1, the actuators 100 open and close, for example, a tailgate (a door) 2 of an automobile 1. The tailgate 2 is installed to be opened and closed at an upper section 3a of an open section 3 via a hinge mechanism (not shown) with respect to the open section 3 formed in a rear section of a vehicle body of the automobile 1.

The actuators 100 are installed at both of left and right sides of the open section 3, and, in each of the actuators 100, one end 100a is pivotably connected to a side frame section 3s of the open section 3 via a pin (not shown), and the other end 100b is pivotably connected to the tailgate 2 via a pin (not shown).

Figure 2:
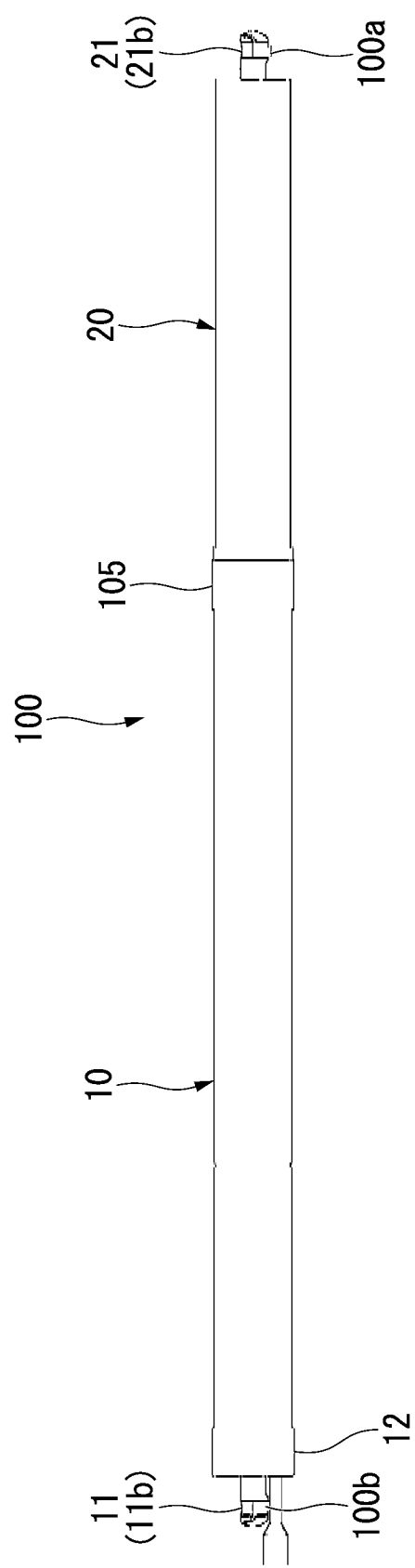
FIG. 2 is a side view showing an appearance of the vehicle door opening/closing actuator according to the embodiment of the present invention.
Figure 3:
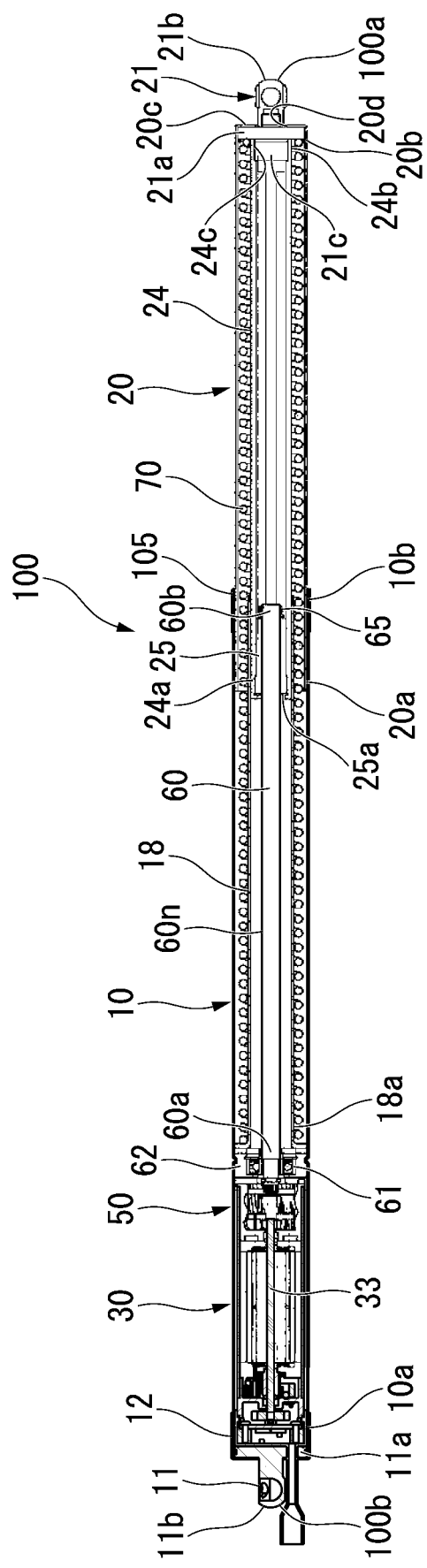
FIG. 3 is a cross-sectional view showing the vehicle door opening/closing actuator according to the embodiment of the present invention.
Figure 4:
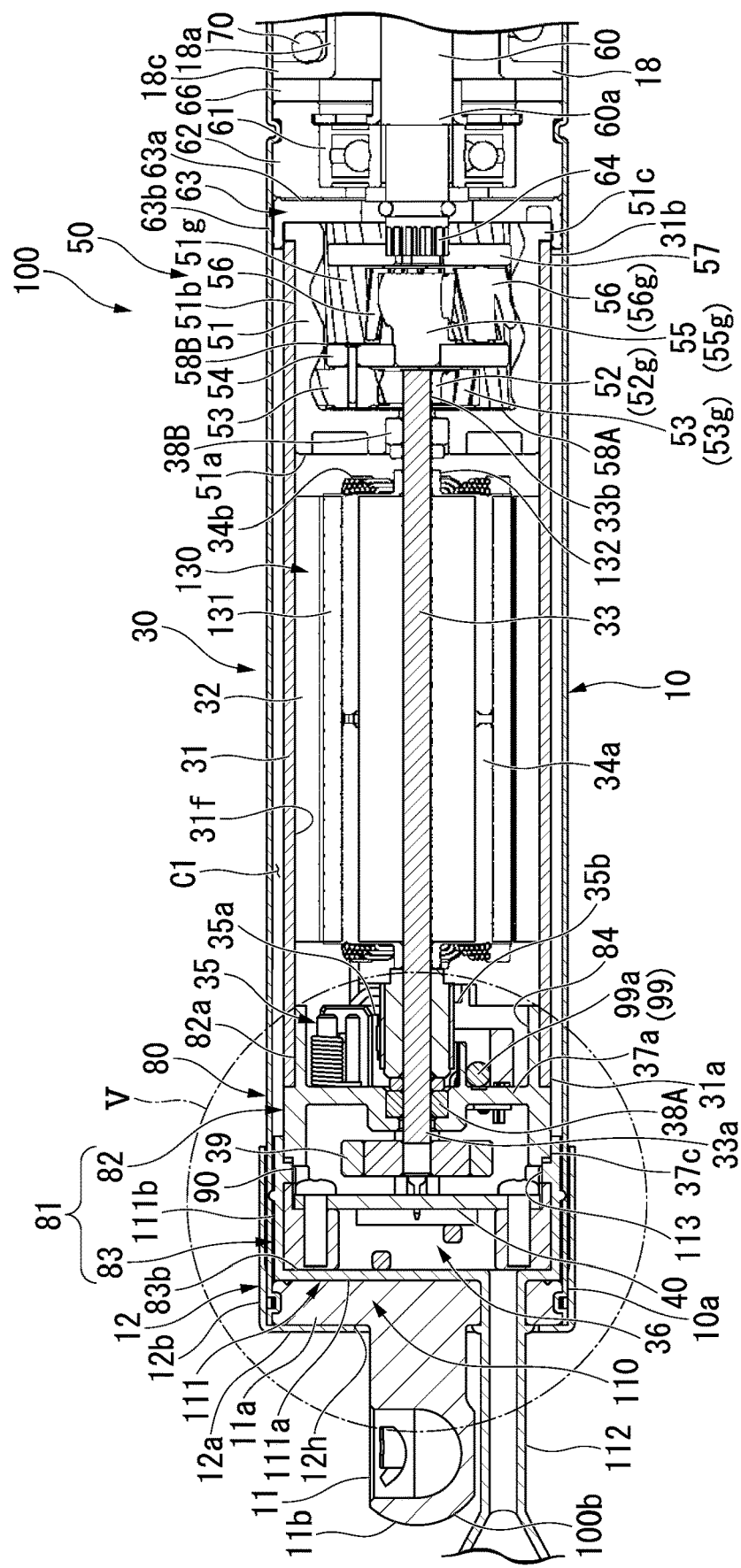
FIG. 4 is an enlarged cross-sectional view showing a motor part and a reduction gear part according to the embodiment of the present invention.

FIG. 2 is a side view showing an appearance of the actuator 100. FIG. 3 is a cross-sectional view of the actuator 100. FIG. 4 is an enlarged cross-sectional view showing a motor part 30 and a reduction gear part 50 of the actuator 100.

As shown in FIGS. 2 and 3, the actuator 100 includes a substantially tubular first housing 10, a tubular second housing 20 installed at the other end 10b side (a right end side in FIG. 3) of the first housing 10, the motor part 30 accommodated in the first housing 10, a brush holder unit 80 serving as a feeding apparatus configured to supply power to the motor part 30, a seal section 110 configured to secure sealability between the brush holder unit 80 and the first housing 10, the reduction gear part 50 configured to reduce and output a rotational force of the motor part 30, a screw shaft 60 rotated by a rotational force of the motor part 30 transmitted via the reduction gear part 50, and a coil spring 70 installed in the first housing 10 and the second housing 20.

Further, in the following description, a direction along a central axis of the housings 10 and 20 is simply referred to as an axial direction, a radial direction of the housings 10 and 20 is simply referred to as a radial direction, and a direction along an outer circumferential surface of the housings 10 and 20 is referred to as a circumferential direction.

The first housing 10 is formed of a metal material such as iron or the like, and a joint member 11 connected to the tailgate 2 side via the pin (not shown) is installed at one end 10a thereof (a left end in FIG. 4). The joint member 11 includes a substantially disk-shaped plate section 11a fitted into the one end 10a of the first housing 10, and a joint section 11b protruding outward from the plate section 11a in the axial direction of the first housing 10 and to which a pin (not shown) is connected. An insertion hole 11c into which a harness cover 112, which will be described below, can be inserted is formed in the plate section 11a.

In addition, a substantially closed-bottom tubular cap 12 is mounted on the one end 10a of the first housing 10. The cap 12 has an closing section 12a configured to close an opening of the one end 10a of the first housing 10, and a tubular section 12b extending from an outer circumferential section of the closing section 12a in a tubular shape and fitted on and fixed (press-fitted) to the one end 10a side of the first housing 10, which are formed integrally with each other. The cap 12 is fixed to the first housing 10 as the one end 10a of the first housing 10 is press-fitted onto the tubular section 12b.

Further, an insertion hole 12h through which the joint section 11b of the joint member 11 and the harness cover 112, which will be described below, of the seal section 110 can be inserted is formed over the majority of the closing section 12a at a substantial center thereof in the radial direction.

As shown in FIG. 3, an outer diameter of the second housing 20 is set to be smaller than an inner diameter of the first housing 10. Accordingly, the second housing 20 freely protrudes from and retracts into the first housing 10. In addition, the second housing 20 is formed of a more flexible material than that of the first housing 10, for example, a resin or the like. In this way, a weight of the second housing 20 is reduced to be lighter than the first housing 10.

One end 20a side (a left end side in FIG. 3) of the second housing 20 is inserted into the first housing 10 from the other end 10b side (the right end side in FIG. 3) of the first housing 10. The second housing 20 is movable in a direction in which the second housing 20 protrudes from and retracts into the other end 10b with respect to the first housing 10.

The other end 20b of the second housing 20 has a bottom section 20c formed by deep drawing or the like. In addition, a joint member 21 is installed at the other end 20b of the second housing 20.

A through-hole 20d through which a joint section 21b, which will be described below, of the joint member 21 can pass is formed in the bottom section 20c of the second housing 20 at a center thereof in the radial direction.

The joint member 21 is configured to connect the side frame section 3s of the open section 3 of the automobile 1 and the second housing 20. The joint member 21 has a substantially disk-shaped plate section 21a fitted into the other end 20b of the second housing 20, and the joint section 21b protruding outward from the plate section 21a in the axial direction via the through-hole 20d formed at the bottom section 20c. The side frame section 3s of the open section 3 is connected to the joint section 21b via a pin (not shown).

The plate section 21a is disposed to face the bottom section 20c and fixed to the other end 20b of the second housing 20 by caulking or the like. In addition, a male screw section 21c protruding inward in the axial direction of the second housing 20 is formed at a center of the plate section 21a in the radial direction. The other end 24b of a tubular inner tube 24 is threadedly engaged with the male screw section 21c.

The tubular inner tube 24 is disposed in the second housing 20. The inner tube 24 is formed by drawing, for example, aluminum. A female screw section 24c threadedly engaged with the male screw section 21c of the joint member 21 is formed on the other end 24b of the inner tube 24.

(Motor Part)

As shown in FIG. 4, the motor part 30 includes a yoke 31, magnets 32 fixed to an inner circumferential surface 31f of the yoke 31, and an armature 130 rotatably installed inside the yoke 31 in the radial direction.

The yoke 31 is formed of a conductive metal in a substantially tubular shape. An outer diameter of the yoke 31 is set to be smaller than an inner diameter of the first housing 10 by a predetermined dimension. The plurality of magnets 32 fixed to the inner circumferential surface 31f of the yoke 31 are elongated in an axial direction of a center of the yoke 31 and installed at predetermined intervals in a circumferential direction of the inner circumferential surface 31f of the yoke 31.

The armature 130 installed inside the yoke 31 in the radial direction has a shaft 33 rotatably installed in the yoke 31, a core 34a fixed to the shaft 33, and a coil 34b wound on the core 34a.

The shaft 33 is installed to extend in the axial direction of the center of the yoke 31. The shaft 33 has one end 33a rotatably supported by the brush holder unit 80. Meanwhile, the other end 33b of the shaft 33 is rotatably supported by the reduction gear part 50.

The core 34a is fitted on and fixed to a position of the shaft 33 corresponding to the magnet 32.

In addition, the core 34a has a plurality of teeth 131 extending radially. The coil 34b is wound on the teeth 131 via insulators 132 having an insulating property.

Power of a battery (not shown) is supplied to the coil 34b of the motor part 30 configured in this way via the brush holder unit 80.

(Brush Holder Unit)

The brush holder unit 80 is disposed at one end 31a side of the yoke 31. The brush holder unit 80 has a brush holder 81 formed of a resin. The brush holder 81 is divided into and constituted by a holder main body 82, and a substantially closed-bottom tubular cover section 83 disposed at a side of the holder main body 82 opposite to the core 34a (a left side in FIG. 4).

The holder main body 82 has a disk-shaped plate section 37a configured to close the one end 31a of the yoke 31, a first tubular section 37b extending from an outer circumferential edge of the plate section 37a and inserted inside the yoke 31, and a second tubular section 37c formed to extend from the plate section 37a toward an opposite side of the first tubular section 37b, which are formed integrally with each other.

The holder main body 82 is mounted by inserting the first tubular section 37b into the yoke 31 and abutting the plate section 37a to the one end 31a of the yoke 31 (a left end in FIG. 4). Then, the first tubular section 37b is fixed to the one end 31a of the yoke 31 not to be relatively rotatable. In addition, a bearing 38A configured to rotatably support the one end 33a side of the shaft 33 is installed at a substantial center of the plate section 37a in the radial direction. The one end 33a of the shaft 33 protrudes outward in the axial direction via the bearing 38A.

A feeding section 35 configured to supply power to the coil 34b of the armature 130 is accommodated in a concave section 84 formed by the plate section 37a and the first tubular section 37b.

The feeding section 35 has a brush 35a held at the feeding section 35 side of the plate section 37a, and a commutator 35b fitted on and fixed to the one end 33a side of the shaft 33 and that comes in sliding contact with the brush 35a. One end 99a of a harness 99 is electrically connected to the brush 35a. The harness 99 passes through the plate section 37a of the holder main body 82, the seal section 110, and the harness 99 is guided toward outside from the one end 10a (the left end in FIG. 4) of the actuator 100. The commutator 35b is electrically connected to the coil 34b.

Meanwhile, a detecting part 36 configured to detect a rotational position of the armature 130 is accommodated in a concave section 85 formed by the plate section 37a and the second tubular section 37c. An outer diameter of the second tubular section 37c is set to be substantially equal to the outer diameter of the yoke 31. A reduced diameter section 86 having a diameter reduced by a step difference is formed at an outer circumferential edge of the second tubular section 37c.

The detecting part 36 includes a sensor magnet 39 and a sensor board 40. The sensor magnet 39 is formed integrally with the one end 33a of the shaft 33 protruding toward the concave section 85 via the bearing 38A.

The sensor board 40 is formed in a plate shape and disposed to oppose the one end 33a of the shaft 33 in the axial direction. When the sensor magnet 39 is rotated together with the shaft 33, a magnetic detector (not shown), such as a Hall IC or the like, configured to detect the rotation is installed at a side of the sensor board 40 opposite to the sensor magnet 39. An output signal line (not shown) configured to output a detection signal of the magnetic detector to the outside is connected to the sensor board 40. The sensor board 40 configured in this way is held at the cover section 83.

Figure 5:
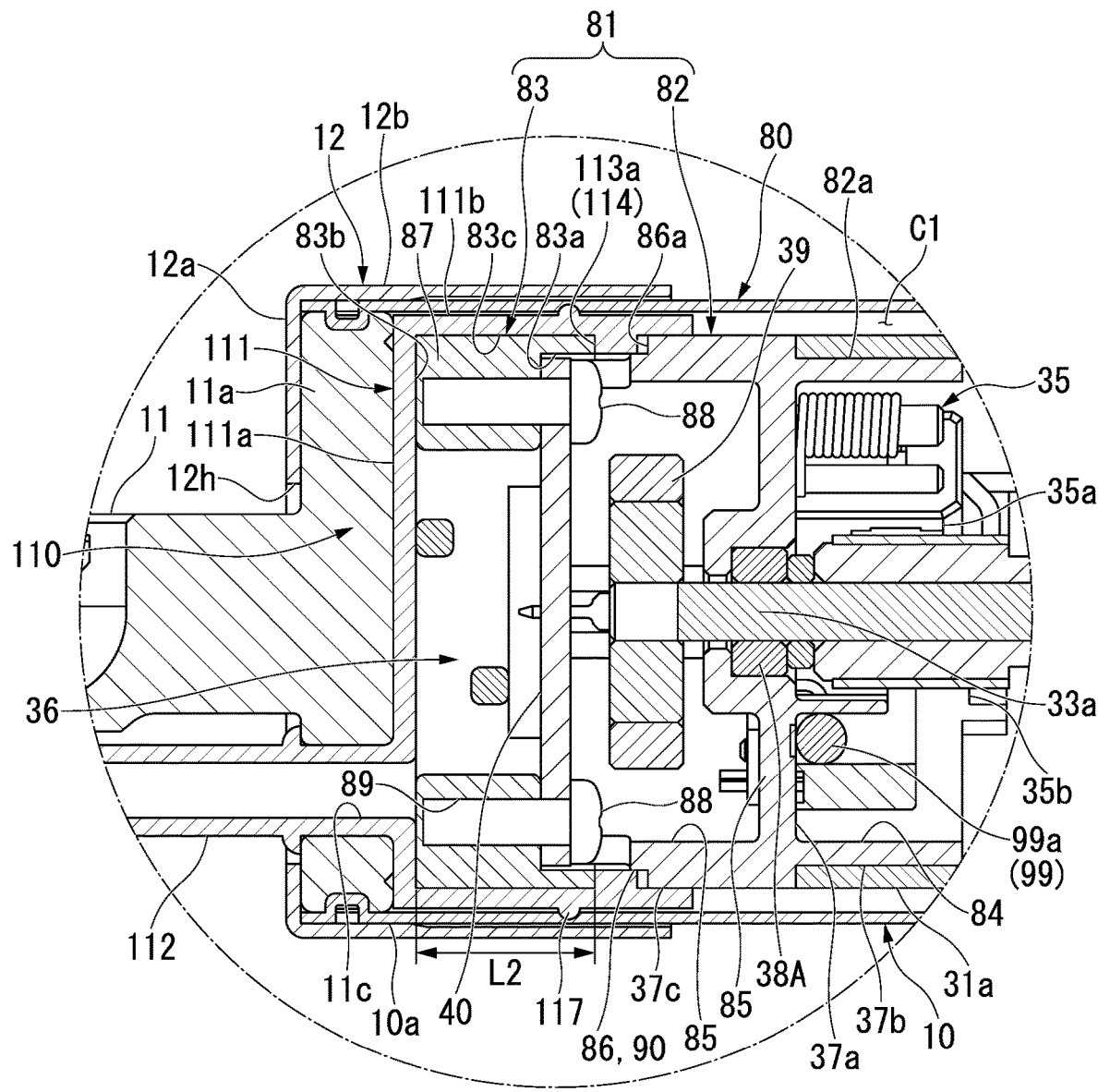
FIG. 5 is an enlarged view of portion V of FIG. 4.
Figure 6:
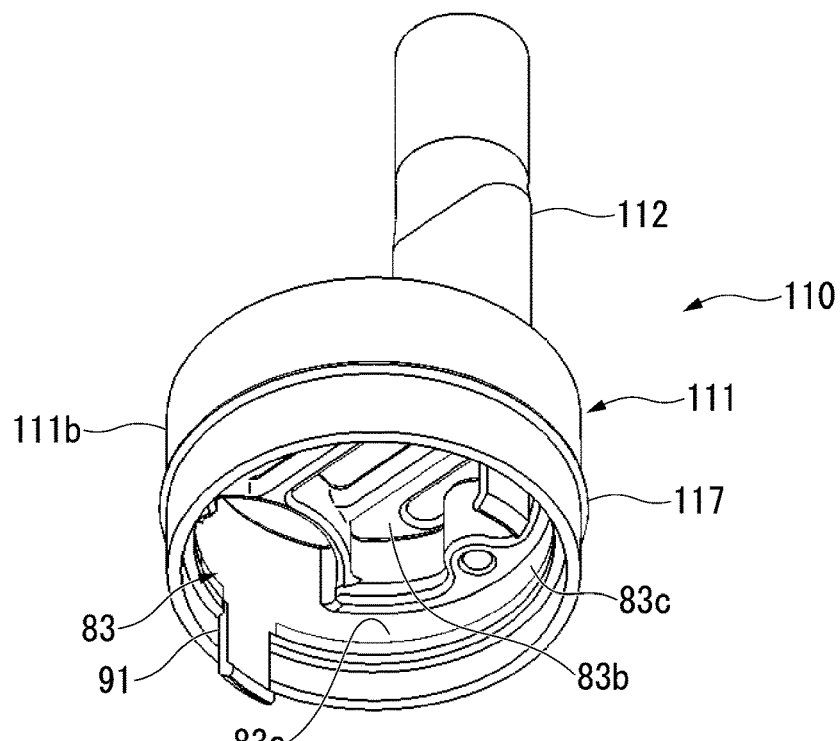
FIG. 6 is a perspective view showing a state in which a cover section is attached to a seal section according to the embodiment of the present invention.

FIG. 5 is an enlarged view of portion V in FIG. 4. FIG. 6 is a perspective view showing a state in which the cover section 83 is attached to the seal section 110 when seen from the holder main body 82 side.

As shown in FIGS. 5 and 6, the cover section 83 is disposed in a state in which an open section 83a side is directed toward the holder main body 82. An outer diameter of a circumferential wall 83c of the cover section 83 is set to be substantially equal to the outer diameter of the second tubular section 37c of the holder main body 82.

A base 87 is erect on a bottom section 83b of the cover section 83 at a position close to an inner circumferential surface thereof and extending in an axial direction of the inner circumferential surface. A female screw section 89 with which a bolt 88 is threadedly engaged is formed in the base 87. Then, the sensor board 40 is placed on the base 87, and the sensor board 40 is fastened and fixed to the base 87 by the bolt 88.

In addition, an engaging claw 91 is formed to extend from the circumferential wall 83c of the cover section 83. The engaging claw 91 is formed to engage the cover section 83 with the holder main body 82. Accordingly, the cover section 83 and the holder main body 82 are integrated with each other.

Here, as a tip of the circumferential wall 83c of the cover section 83 abuts a tip of the second tubular section 37c of the holder main body 82, when the brush holder 81 is seen as a whole, the reduced diameter section 86 formed at an outer circumferential edge of the second tubular section 37c is a concave section 90 formed throughout a circumference of the outer circumferential surface of the brush holder 81. The concave section 90 has a role of restricting movement of the seal section 110 in the axial direction.

(Seal Section)

Figure 7:
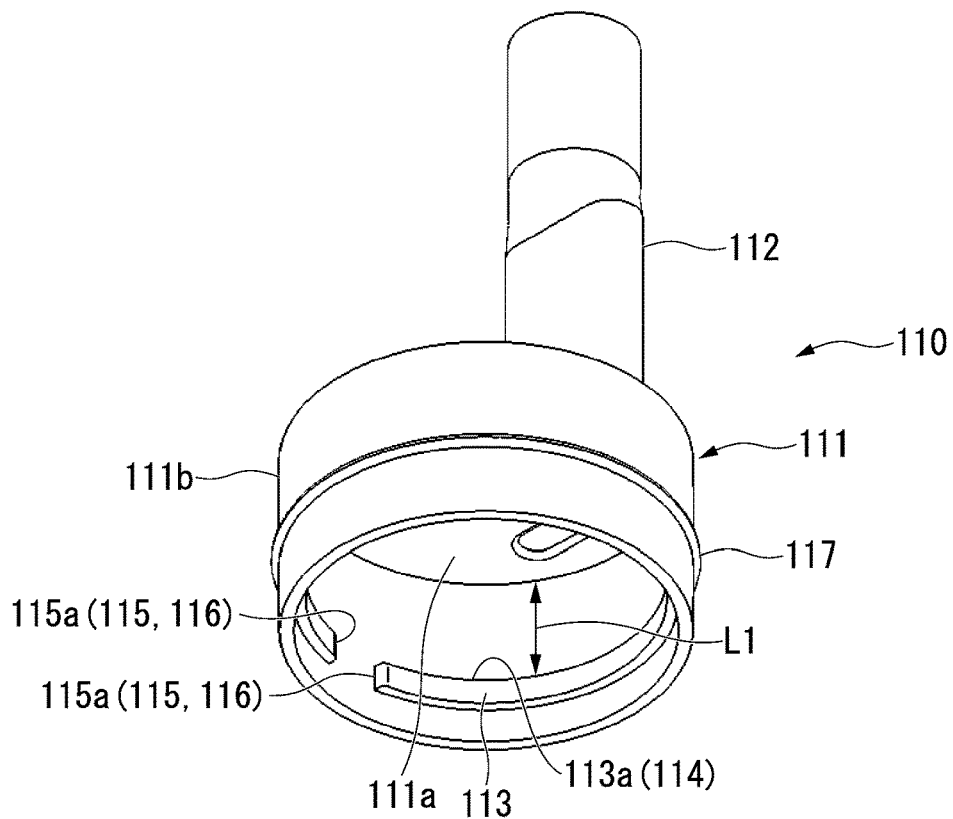
FIG. 7 is a perspective view of the seal section according to the embodiment of the present invention.

FIG. 7 is a perspective view of the seal section 110 when seen from the holder main body 82 side.

As shown in FIGS. 5 and 7, the seal section 110 is formed of a rubber-based material having elasticity. The seal section 110 has a seal main body 111 formed in a substantially closed-bottom tubular shape to cover the outer surface of the cover section 83. That is, the seal main body 111 has a disk-shaped bottom section 111a configured to cover the bottom section 83b of the cover section 83, and a circumferential wall 111b configured to cover the outer circumferential surface of the circumferential wall 83c of the cover section 83 formed to extend from an outer circumferential edge of the bottom section 111a.

The bottom section 111a is formed to be disposed between the bottom section 83b of the cover section 83 and the plate section 11a of the joint member 11. The harness cover 112 protruding outward in the axial direction is formed integrally with the bottom section 111a.

The harness cover 112 is substantially formed in a pipe shape and brings the inside amid the outside of the seal main body 111 in communication with each other. The harness 99 having the one end 99a connected to the feeding section 35 is inserted through the harness cover 112 configured in this way. Accordingly, the harness 99 is guided from the one end 10a (a left end in FIG. 5) of the actuator 100 to the outside.

Meanwhile, the circumferential wall 111b of the seal main body 111 extends from the bottom section 111a to a substantial center of the second tubular section 37c of the holder main body 82 in the axial direction. As the circumferential wall 111b covers the circumferential wall 83c of the cover section 83 and the second tubular section 37c of the holder main body 82, the circumferential wall 111b is interposed between the brush holder 81 and the first housing 10. Accordingly, a clearance C1 is formed between the brush holder 81 and the yoke 31, and the first housing 10.

In addition, a rib 113 is formed integrally with an inner circumferential surface of the circumferential wall 111b of the seal main body 111 at a position corresponding to the reduced diameter section 86 (the concave section 90) which is slightly before the tip throughout the circumference. An inner diameter of the rib 113 is set to be smaller than or substantially equal to an outer diameter of the reduced diameter section 86. The above-mentioned rib 113 is accommodated in the reduced diameter section 86 (the concave section 90). Then, the rib 113 is disposed between a stepped surface 86a of the reduced diameter section 86 of the second tubular section 37c and the circumferential wall 83c of the cover section 83 from both sides in the axial direction.

In addition, a distance L1 (see FIG. 7) between the rib 113 and the bottom section 111a is set to be substantially equal to a height L2 (see FIG. 5) of the circumferential wall 83c of the cover section 83. That is, an end surface 113a of the rib 113 on the bottom section 111a side functions as a positioning section (a first positioning section) 114 configured to perform positioning of the cover section 83 and the seal section 110 in the axial direction.

Further, a cutout section 115 configured to receive the engaging claw 91 is formed in the rib 113 at a position of the cover section 83 corresponding to the engaging claw 91. A portion of the engaging claw 91 is fitted into the cutout section 115. That is, an end surface 115a of the cutout section 115 of the rib 113 in the circumferential direction functions as a positioning section (a second positioning section) 116 configured to perform positioning of the cover section 83 and the seal section 110 in the circumferential direction.

In addition, an auxiliary seal section 117 is formed in an outer circumferential surface of the circumferential wall 111b of the seal main body 111 in the vicinity of the rib 113. The auxiliary seal section 117 is formed to protrude throughout the circumference of the circumferential wall 111b. In a state in which the seal section 110 is attached to the brush holder 81, the auxiliary seal section 117 is squeezed by an inner circumferential surface of the first housing 10. Accordingly, sealability between the brush holder 81 and the first housing 10 is increased.

With such a configuration, the shaft 33 is rotated and driven about the central axis by a magnetic attractive force or repulsive force generated between a magnetic force generated in the coil 34b and a magnetic force generated in the magnet 32 fixed to the yoke 31 when the coil 34b is energized via the harness 99 and the feeding section 35 (the brush 35a).

The detecting part 36 detects the number of revolutions of the shall 33 by detecting rotation of the sensor magnet 39 of the detecting part 36 installed integrally with the shaft 33 using the magnetic detector (not shown) of the sensor board 40. The rotation of the sensor magnet 39 detected by the magnetic detector, i.e., rotation of the shaft 33, is output from the other end 10b of the actuator 100 to the outside via an output signal line (not shown).

(Reduction Gear Part)

As shown in FIG. 4, the reduction gear part 50 is installed at a side of the motor part 30 opposite to the feeding section 35. The reduction gear part 50 includes an internal gear 51, a first sun gear 52, a first stage planetary gear 53, a first carrier 54, a second sun gear 55, a second stage planetary gear 56, and a second carrier 57.

The internal gear 51 is inserted into the other end 31b side of the yoke 31 (a right end side in FIG. 4). The internal gear 51 integrally includes a plate section 51a substantially having a disk shape, a substantially tubular section 51b extending from an outer circumferential section of the plate section 51a toward the other end 31b of the yoke 31, and a flange section 51c having a diameter increased from the tubular section 51b toward an outer circumferential side at an end portion opposite to the plate section 51a.

The internal gear 51 has the plate section 51a directed toward the one end 31a side of the yoke 31. Then, the internal gear 51 is mounted while the tubular section 51b being inserted into the yoke 31 and the flange section 51c being abutted to the other end 31b of the yoke 31. The flange section 51c of the internal gear 51 is fixed to the other end 31b of the yoke 31 by caulking or the like to be immovable relative to the yoke 31 in the circumferential direction.

In addition, gear teeth 51g are formed on an inner circumferential surface of the tubular section 51b of the internal gear 51. Further, a bearing 38B is installed on the plate section 51a of the internal gear 51 at a substantial center thereof in the radial direction. The other end 33b side of the shaft 33 is rotatably supported by the bearing 38B.

The first sun gear 52 is fitted onto the other end 33b of the shaft 33, and gear teeth 52g are formed on an outer circumferential surface thereof.

For example, three first stage planetary gears 53 are installed on an outer circumferential section of the first sun gear 52.

Each of the first stage planetary gears 53 has gear teeth 53g formed on an outer circumferential surface thereof and meshes with the gear teeth 52g of the first sun gear 52 and the gear teeth 51g of the internal gear 51.

The first carrier 54 is substantially formed in a disk shape and disposed at an opposite side of the shaft 33 with respect to the plurality of first stage planetary gears 53. The first carrier 54 is substantially formed in a disk shape and a support shaft configured to rotatably support the first stage planetary gear 53 is assembled thereto.

The second sun gear 55 is installed integrally with a central section of the first carrier 54 opposite to the shaft 33. The second sun gear 55 has gear teeth 55g formed on an outer circumferential surface thereof.

For example, three second stage planetary gears 56 are formed at an outer circumferential section of the second sun gear 55.

Each of the second stage planetary gears 56 has gear teeth 56g formed on an outer circumferential surface thereof and meshes with the gear teeth 55g of the second sun gear 55 and the gear teeth 51g of the internal gear 51.

The second carrier 57 is disposed at an opposite side of the shaft 33 with respect to the plurality of second stage planetary gears 56. The second carrier 57 is formed in a disk shape, and a support shaft (not shown) configured to rotatably support the second stage planetary gear 56 is assembled thereto.

Here, a washer 58A is disposed between the plate section 51a of the internal gear 51 and the first stage planetary gear 53, and a washer 58B is disposed between the first carrier 54 and the second stage planetary gear 56.

The first sun gear 52 and the second sun gear 55 are formed of a metal such as a sintered material or the like. In addition, the first carrier 54 and the second carrier 57 are also formed of a metal.

Further, the internal gear 51, the first stage planetary gear 53, and the second stage planetary gear 56 are formed of a resin.

Further, the gear teeth 51g of the internal gear 51, the gear teeth 52g of the first sun gear 52, the gear teeth 53g of the first stage planetary gear 53, the gear teeth 55g of the second sun gear 55, and the gear teeth 56g of the second stage planetary gear 56 are helical gears. Accordingly, a meshing allowance between each of the gears of the reduction gear part 50 can be increased, and operating noise can be reduced.

In addition, in the gear teeth 51g of the internal gear 51, a portion meshes with the gear teeth 53g of the first stage planetary gear 53 and a portion meshes with the gear teeth 56g of the second stage planetary gear 56 are formed by the gear teeth 51g having the same continuous pitch. Accordingly, the internal gear 51 can be easily manufactured.

In the above-mentioned reduction gear part 50, when the shaft 33 is rotated, the first sun gear 52 is rotated integrally with the shaft 33. Rotation of the first sun gear 52 is transmitted to the first stage planetary gear 53 on the outer circumferential side thereof. Each of the first stage planetary gears 53 performs so-called planetary motion in which the gear rotates about a support shaft assembled to the first carrier 54 at the same time that the first stage planetary gears 53 revolve around the outer circumferential section of the first sun gear 52 while meshing with the gear teeth 52g of the first sun gear 52 and the gear teeth 51g of the internal gear 51 on the outer circumferential side.

The first carrier 54 is decelerated and rotated coaxially with the shaft 33 by the planetary motion of the plurality of first stage planetary gears 53.

When the first carrier 54 is rotated, the second sun gear 55 is rotated therewith, and the rotation is transmitted to the second stage planetary gear 56 on the outer circumferential side. Each of the second stage planetary gears 56 performs so-called planetary motion in which the gear rotates about the support shaft assembled to the second carrier 57 at the same time that the second stage planetary gears 56 revolve around the outer circumferential section of the second sun gear 55 while meshing with the gear teeth 55g of the second sun gear 55 and the gear teeth 51g of the internal gear 51 on the outer circumferential side.

The second carrier 57 is decelerated and rotated coaxially with the shaft 33 by the planetary motion of the plurality of second stage planetary gears 56.

An annular bearing holder 62 is fitted to a side (a right side in FIG. 4) of the first housing 10 closer to the other end 10b than the reduction gear part 50. The bearing holder 62 is fixed to the first housing 10 by caulking or the like. A bearing 61 configured to rotatably support one end 60a of the screw shaft 60 is held at the bearing holder 62.

In addition, a damper member 63 is installed between the flange section 51c of the internal gear 51 and the bearing 61 and the bearing holder 62. The damper member 63 is configured to suppress transmission of vibrations of the motor part 30 and the reduction gear part 50 to the first housing 10. The damper member 63 is formed of a rubber-based material having elasticity.

The damper member 63 has a disk-shaped plate section 63a disposed between the flange section 51c of the internal gear 51 and the bearing 61 and the bearing holder 62. A tubular section 63b extending from the outer circumferential edge of the plate section 63a toward the internal gear 51 side and into which the flange section 51c of the internal gear 51 is inserted is formed integrally with an outer circumferential edge of the plate section 63a.

Here, at the other end 31b side of the yoke 31, the tubular section 63b of the damper member 63 is interposed between the first housing 10 and the other end 31b of the yoke 31 and the flange section 51c of the internal gear 51. Accordingly, the clearance C1 is formed between the yoke 31 and the first housing 10. That is, the motor part 30 and the reduction gear part 50 float and are supported in the first housing 10 by the seal section 110 and the damper member 63 installed at both ends of the motor part 30 and the reduction gear part 50 in the axial direction. In this way, the seal section 110 also has a damper function configured to suppress the transmission of vibrations of the motor part 30 and the reduction gear part 50 to the first housing 10 together with the function of securing sealability between the brush holder unit 80 and the first housing 10.

A gear 64 meshes with an output gear hole 57h formed in a central section of the second carrier 57 of the reduction gear part 50 is installed at the one end 60a of the screw shaft 60 rotatably supported by the bearing 61 of the bearing holder 62. Accordingly, the rotation of the shaft 33 in the motor part 30 is transmitted to the screw shall 60 via the reduction gear part 50 such that the screw shaft 60 is rotated and driven about a central axis thereof.

As shown in FIG. 3, a spirally continuous screw thread 60n is formed at an outer circumferential surface of the screw shaft 60. The other end 60b side of the screw shaft 60 is threadedly engaged with a nut member 25 formed in one end 24a of the inner tube 24 of the second housing 20. An end portion 25a of the nut member 25 is fixed to the inner tube 24 by a snap ring (not shown), caulking, or the like. Accordingly, the nut member 25 restricts rotation in the circumferential direction with respect to the inner tube 24.

Since the other end 24b of the inner tube 24 is threadedly engaged with the joint member 21 installed at the other end 20b of the second housing 20, relative rotation between the nut member 25 and the second housing 20 is restricted via the joint member 21 and the inner tube 24.

The coil spring 70 installed in the first housing 10 and the second housing 20 is formed of, for example, a metal. The inner tube 24 is inserted further inside the second housing 20 in the radial direction than the coil spring 70. Meanwhile, a tubular guide tube 18 is inserted further inside the first housing 10 in the radial direction than the coil spring 70.

A guide tube 18 has an inner diameter that is set to be larger than an outer diameter of the inner tube 24. For this reason, the inner tube 24 is inserted and disposed inside the guide tube 18 in the radial direction.

In addition, as shown in FIG. 4, a flange section 18c overhanging the outer circumferential side is formed integrally with one end 18a side of the guide tube 18. Further, an annular sealing member 66 is disposed between the flange section 18c of the guide tube 18 and the bearing holder 62. The sealing member 66 is formed of a material having a waterproof property and elasticity such as a rubber-based material or the like, and an outer circumferential surface thereof is adhered to the first housing 10.

As the inner tube 24 and the guide tube 18 are inserted through the inside of the coil spring 70, the coil spring 70 is suppressed from flexing or buckling sideward in an expansion/contraction direction during expansion/contraction of the coil spring 70.

As shown in FIG. 3, the coil spring 70 is installed between the plate section 21a of the joint member 21 of the second housing 20 and the flange section 18c of the guide tube 18 in a compressed state. Accordingly, the coil spring 70 is biased in a direction in which the first housing 10 and the second housing 20 are separated from each other and an entire length of the actuator 100 is extended.

In addition, the flange section 18c of the guide tube 18 is pressed toward the sealing member 66 by the coil spring 70. In other words, the sealing member 66 is disposed between by the flange section 18c of the guide tube 18 and the bearing holder 62.

Further, a tubular outer ring 105 is installed on the other end 10b of the first housing 10 at an outer circumferential side thereof. The outer ring 105 is formed of a material having high stiffness such as a metal or the like, and press-fitted and fixed to the other end 10b of the first housing 10. The outer ring 105 is configured to prevent intrusion of water, dust, or the like into the actuator 100 from a gap between the first housing 10 and the second housing 20.

(Operation of Vehicle Door Opening/Closing Actuator)

Next, an operation of the actuator 100 will be described.

When power of a battery (not shown) is applied to the motor part 30 and the shaft 33 of the motor part 30 is rotated and driven by a manipulation of an operator, rotation of the shaft 33 is transmitted to the screw shaft 60 via the reduction gear part 50. Accordingly, when the screw shaft 60 is rotated, the nut member 25 moves along the screw shaft 60 in the axial direction. Since the nut member 25 is fixed to the inner tube 24 integrated with the second housing 20, the second housing 20 protrudes from and retracts into the first housing 10, and the actuator 100 expands and contracts.

Here, since the second housing 20 is formed of a flexible material such as a resin or the like while the first housing 10 is formed of a metal material such as iron or the like, a slide trace will not be formed in both of the first housing 10 and the second housing 20. That is, the slide trace will be formed in only the second housing 20. Moreover, as the second housing 20 is formed of a resin or the like, the slide trace is inconspicuous and a design property is maintained.

When the second housing 20 retracts into the first housing 10, the tailgate 2 (see FIG. 1) installed at the open section 3 of the automobile 1 is closed. Meanwhile, when the second housing 20 protrudes from the first housing 10, the tailgate 2 installed at the open section 3 of the automobile 1 is opened. Here, even when an operation of the motor part 30 is stopped in a state in which the actuator 100 is extended, a state in which the second housing 20 protrudes from the first housing 10 is maintained by a biasing force of the coil spring 70.

(Attachment Method of Seal Section)

Next, a method of attaching the seal section 110 to the brush holder 81 will be described.

First, the feeding section 35 (the brush 35a) is previously assembled to the holder main body 82, and the detecting part 36 (the sensor board 40) is assembled to the cover section 83.

Then, the bottom section 83b of the cover section 83 that constitutes the brush holder 81 is directed toward an open section of the seal main body 111 of the seal section 110. In addition, a position of the engaging claw 91 of the cover section 83 is matched to the cutout section 115 (the positioning section 116) formed in the rib 113 of the seal section 110.

Then, the cover section 83 is inserted into the seal main body 111 from the bottom section 83b side.

Here, when the bottom section 83b of the cover section 83 abuts the bottom section 111a of the seal main body 111, a tip of the circumferential wall 83c of the cover section 83 abuts the end surface 113a (the positioning section 114) of the rib 113 of the seal main body 111. That is, the circumferential wall 83c of the cover section 83 is engaged with the rib 113 of the seal main body 111 while positioning of the cover section 83 with respect to the seal main body 111 in the axial direction is performed.

In addition, as the engaging claw 91 of the cover section 83 is fitted into the cutout section 115 (the positioning section 116) of the rib 113, positioning of the cover section 83 with respect to the seal main body 111 in the circumferential direction is performed.

Next, the seal section 110 to which the cover section 83 is assembled is assembled to the holder main body 82 of the brush holder 81. In this regard, first, the open section of the seal main body 111 is directed toward the holder main body 82. Then, the seal section 110 is assembled such that the seal main body 111 is fitted onto the second tubular section 37c of the holder main body 82. In other words, the seal section 110 is assembled such that the circumferential wall 111b of the seal main body 111 is inserted between the first housing 10 and the second tubular section 37c of the holder main body 82.

Here, the rib 113 of the seal main body 111 is fitted onto the reduced diameter section 86 of the second tubular section 37c and the seal main body 111 is pushed into the holder main body 82 side until the rib 113 abuts the stepped surface 86a of the reduced diameter section 86. Then, the rib 113 of the seal main body 111 is received in the concave section 90 formed by the reduced diameter section 86 of the holder main body 82 and the circumferential wall 83c of the cover section 83.

Here, the auxiliary seal section 117 is formed on the outer circumferential surface of the circumferential wall 111b of the seal main body 111 in the vicinity of the rib 113. For this reason, while inserting the circumferential wall 111b of the seal main body 111 between the first housing 10 and the second tubular section 37c of the holder main body 82, the auxiliary seal section 117 is squeezed by the first housing 10. Further, the rib 113 is pushed toward the second tubular section 37c of the holder main body 82. For this reason, the circumferential wall 111b of the seal main body 111 is prevented from turning upward during the assembly of the seal section 110.

After that, the engaging claw 91 of the cover section 83 is engaged with the holder main body 82, and assembly of the seal section 110 to the brush holder 81 is terminated.

Further, a timing when the harness 99 or an output signal line (not shown) is inserted through the harness cover 112 of the seal section 110 can be selected each time. That is, the harness cover 112 may be assembled to the brush holder 81 after the harness 99 or the output signal line is previously inserted through the harness cover 112, and the harness 99 or the output signal line may be inserted into the harness cover 112 after the harness cover 112 is assembled to the brush holder 81.

In this way, in the above-mentioned embodiment, the concave section 90 formed by the reduced diameter section 86 of the holder main body 82 and the circumferential wall 83c of the cover section 83 is formed in the brush holder 81. In addition, the rib 113 accommodated in the concave section 90 is formed integrally with the seal main body 111 of the seal section 110. For this reason, deviation of the seal section 110 in the axial direction with respect to the brush holder 81 can be prevented. For this reason, assemblability of the actuator 100 can be improved and sealability can be improved.

In addition, the brush holder 81 is divided into and constituted by the holder main body 82 and the cover section 83.

Then, the concave section 90 is formed when the holder main body 82 and the cover section 83 are integrated (as the holder main body 82 and the cover section 83 cooperate with each other). For this reason, after the cover section 83 is previously assembled to the seal main body 111, the seal main body 111 and the cover section 83 can be assembled together to the holder main body 82. Accordingly, assembly and positioning of the seal section 110 on the brush holder 81 can be easily performed.

Further, since the rib 113 of the seal section 110 accommodated in the concave section 90 is disposed bet teen the holder main body 82 and the cover section 83, deviation of the seal section 110 in the axial direction with respect to the brush holder 81 can be securely prevented.

In addition, the end surface 113a of the rib 113 on the bottom section 111a side functions as the positioning section (the first positioning section) 114 configured to perform the positioning of the cover section 83 and the seal section 110 in the axial direction. Further, while the engaging claw 91 configured to engage with the holder main body 82 is formed integrally with the cover section 83, the cutout section 115 that receives the engaging claw 91 is formed in the rib 113. Then, the end surface 115a of the cutout section 115 of the rib 113 in the circumferential direction functions as the positioning section (the second positioning section) 116 configured to perform the positioning of the cover section 83 and the seal section 110 in the circumferential direction.

In this way, as the positioning with respect to the brush holder 81 in the axial direction and the positioning in the circumferential direction are separately performed, a position of the seal section 110 with respect to the brush holder 81 can be precisely determined. For this reason, assemblability of the actuator 100 can be further improved.

In addition, the auxiliary seal section 117 is formed in the outer circumferential surface of the circumferential wall 111b of the seal main body 111 in the vicinity of the rib 113. For this reason, the auxiliary seal section 117 is squeezed by the first housing 10 while the circumferential wall 111b of the seal main body 111 is inserted between the first housing 10 and the second tubular section 37c of the holder main body 82. Accordingly, the rib 113 is pushed toward the second tubular section 37c of the holder main body 82. Accordingly, the circumferential wall 111b of the seal main body 111 is prevented from turning upward during assembly of the seal section 110. Accordingly, assemblability of the actuator 100 can be further improved.

In addition, the motor part 30 and the reduction gear part 50 float and are supported in the first housing 10 by the seal section 110 and the damper member 63 installed at both ends of the motor part 30 and the reduction gear part 50 in the axial direction. For this reason, transmission of vibrations of the motor part 30 or the reduction gear part 50 and vibrations between the motor part 30 or the reduction gear part 50 and the screw shaft 60 to the first housing 10 can be suppressed. Accordingly, vibration or noise during operation of the actuator 100 can be reduced.

Further, the present invention is not limited to the above-mentioned embodiment, and various modifications may be added to the above-mentioned embodiment without departing from the scope of the present invention.

For example, configurations of the respective parts of the actuator 100 can be appropriately modified without departing from the scope of the present invention. As an example, in the above-mentioned embodiment, the case in which the reduction gear part 50 is constituted by a planetary speed reducing mechanism has been described. However, embodiments are not limited thereto, and various speed reducing mechanisms may be applied instead of the planetary speed reducing mechanism. In this case, a gear case of the speed reducing mechanism is disposed on the inner circumferential surface of the yoke 31 of the motor part 30, and further, the bearing 38B configured to rotatably support the shaft 33 may be installed on the gear case.

In addition, in the above-mentioned embodiment, the case in which the motor part 30 is a so-called brush motor in which power is applied to the commutator 35b of the armature 130 and a feeding apparatus is constituted by the brush holder 81 configured to support the brush 35a that supplies power to the motor part 30 has been described. However, embodiments are not limited thereto, and the motor part serving as a so-called brushless motor having no brush may have a configuration in which a feeding apparatus is constituted as a bus bar unit configured to selectively apply power of a battery to a coil.

Further, in the above-mentioned embodiment, the case in which the brush holder 81 of the brush holder unit 80 serving as a feeding apparatus is divided into and constituted by the holder main body 82 and the cover section 83 has been described. However, embodiments are not limited thereto, and the holder main body 82 and the cover section 83 may be formed integrally. In this case, the concave section 90 configured to receive the rib 113 may be formed in the outer circumferential surface of the brush holder 81.

Further, use of the actuator 100 is not limited to opening/closing the tailgate 2, and the actuator 100 may be used to open/close various doors.

In addition, components exemplified in the above-mentioned embodiment may be appropriately selected or other components may be appropriately modified without departing from the scope of the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An actuator comprising:
a tubular housing;
a motor part accommodated in the housing;
a feeding apparatus accommodated in the housing and that supplies power to the motor part; and
a closed-bottom tubular seal section that has a circumferential wall arranged to be interposed between an inner circumferential surface of the housing and an outer circumferential surface of the feeding apparatus, and that is arranged to cover the feeding apparatus with an entire thereof,
wherein a rib is formed along a circumferential direction at an inner circumferential surface of the circumferential wall of the seal section, and
a concave section that receives the rib is formed at the outer circumferential surface of the feeding apparatus,
wherein the feeding apparatus includes:
a brush that supplies power to the motor part;
a holder main body that supports the brush; and
a cover section disposed at an end surface of the holder main body, and
wherein the seal section covers an outer circumferential surface of the cover section.

2. The actuator according to claim 1,
wherein the holder main body and the cover section cooperate to form the concave section, and
the rib is disposed between the holder main body and the cover section.

3. The actuator according to claim 2,
wherein the cover section has a claw section that engages with the holder main body,
the rib has:
a first positioning section that performs positioning of the cover section with respect to the seal section in an axial direction; and
a second positioning section that performs positioning of the cover section with respect to the seal section in the circumferential direction, and
the claw section is disposed at a position corresponding to the second positioning section.

4. The actuator according to claim 1,
wherein an auxiliary seal section that secures sealability between the seal section and the housing is formed at an outer circumferential surface of the circumferential wall of the seal section, and
the auxiliary seal section is formed as a protrusion throughout a circumference of the outer circumferential surface of the circumferential wall and is disposed in a vicinity of the rib.

5. The actuator according to claim 2,
wherein an auxiliary seal section that secures sealability between the seal section and the housing is formed at an outer circumferential surface of the circumferential wall of the seal section, and
the auxiliary seal section is formed as a protrusion throughout a circumference of the outer circumferential surface of the circumferential wall and is disposed in a vicinity of the rib.

6. The actuator according to claim 3,
wherein an auxiliary seal section that secures sealability between the seal section and the housing is formed at an outer circumferential surface of the circumferential wall of the seal section, and
the auxiliary seal section is formed as a protrusion throughout a circumference of the outer circumferential surface of the circumferential wall and is disposed in a vicinity of the rib.

7. A vehicle door opening/closing actuator that uses the actuator according to claim 1 in order to open/close a door that is installed to be capable of being opened and closed with respect to an open section,
wherein the housing is connected to any one of the open section and the door.

8. A vehicle door opening/closing actuator that uses the actuator according to claim 2 in order to open/close a door that is installed to be capable of being opened and closed with respect to an open section,
wherein the housing is connected to any one of the open section and the door.

9. A vehicle door opening/closing actuator that uses the actuator according to claim 3 in order to open/close a door that is installed to be capable of being opened and closed with respect to an open section,
wherein the housing is connected to any one of the open section and the door.

10. A vehicle door opening/closing actuator that uses the actuator according to claim 4 in order to open/close a door that is installed to be capable of being opened and closed with respect to an open section, wherein the housing is connected to any one of the open section and the door.

11. A vehicle door opening/closing actuator that uses the actuator according to claim 5 in order to open/close a door that is installed to be capable of being opened and closed with respect to an open section,
wherein the housing is connected to any one of the open section and the door.

12. A vehicle door opening/closing actuator that uses the actuator according to claim 6 in order to open/close a door that is installed to be capable of being opened and closed with respect to an open section,
wherein the housing is connected to any one of the open section and the door.

* * * * *